UNITED STATES PATENT OFFICE.

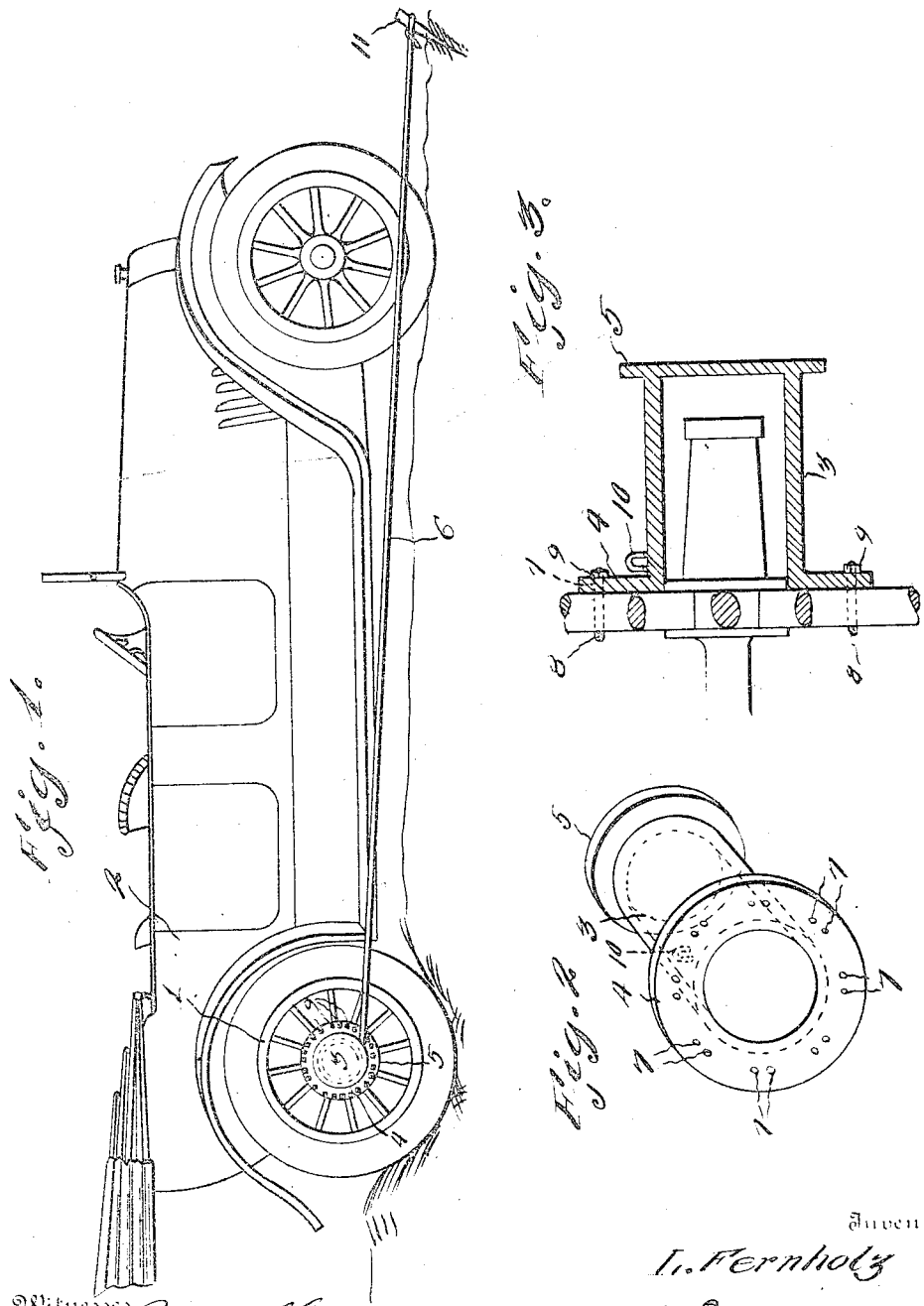

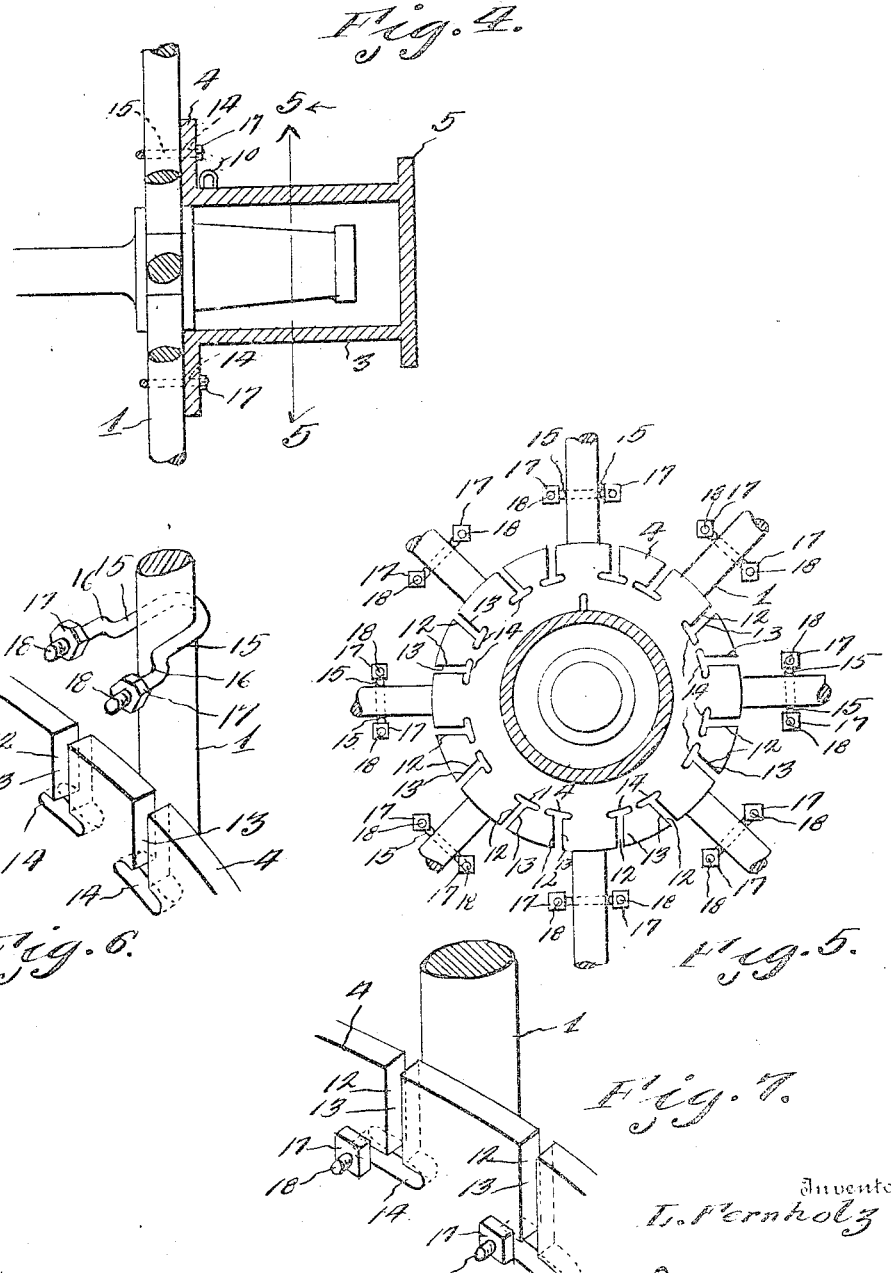

LAWRENCE FERNHOLZ, OF ARCADIA, WISCONSIN.

EMERGENCY-WINDLASS FOR AUTOMOBILES.

1,225,946.    Specification of Letters Patent.    Patented May 15, 1917.

Application filed June 6, 1916. Serial No. 101,927.

*To all whom it may concern:*

Be it known that I, LAWRENCE FERNHOLZ, a citizen of the United States, residing at Arcadia, in the county of Trempealeau, State of Wisconsin, have invented a new and useful Emergency-Windlass for Automobiles; and I do hereby declare the following to be a full, clear, and exact description of the invention, such as will enable others skilled in the art to which it appertains to make and use the same.

This invention relates to an improved emergency draft windlass adapted for use in connection with automobiles, and an object of the invention is to provide a device of this kind adapted to be detachably connected to one of the driving wheels of the automobile and provided with a cable having a connection with a stake, tree or stump near the head of the automobile, so that when the driving wheel is in rotation or revoluble movement and the machine is stuck in the mud, sand or snow, the cable between the stake and the windlass drum will automatically wind upon the drum, thereby causing the machine to pull itself onto the roadbed over which it may be propelled in the customary manner.

Another object of the invention is to provide a draft windlass drum having improved means whereby the same may be detachably clamped to any size of automobile driving wheel, regardless of the number of spokes therein and their spaced relation.

Another object of the invention is the provision of a draft windlass drum having annularly arranged slots provided with T-shaped portions concentric with the center of the drum, to receive the shanks or arms of staples, which arch spokes of the wheel, so that by giving a partial turn to the drum, the drum may be locked to the spokes of the wheel, while the cable is winding thereon.

Another object of the invention is to provide a plurality of staples, the legs or arms of which being so shaped as to permit the staples to arch the spokes without removing the nuts from the arms or shanks of the staples, thereby permitting the windlass drum to be quickly attached to the wheel.

In practical fields the details of construction may necessitate alterations falling within the scope of what is claimed.

The invention comprises further features and combination of parts, as hereinafter set forth, shown in the drawings, and claimed.

In the drawings:—

Figure 1 is a view in side elevation of an automobile showing the same in the act of pulling itself out of the mire, mud or the like.

Fig. 2 is a detail perspective view of the draft windlass drum.

Fig. 3 is a sectional view through the drum.

Fig. 4 is a sectional view showing another method or means for fastening the drum to the spokes of the wheel.

Fig. 5 is a sectional view on line 5—5 of Fig. 4, illustrating the staples or bolts about to be engaged with the T-shaped slots of one of the flanges of the drum.

Fig. 6 is a detail perspective view of a portion of the flange of the drum, showing two of the T-shaped slots, and a wheel spoke illustrating one of the staples, said parts being in the act of connection.

Fig. 7 is a view in perspective showing the parts in Fig. 6 as having been connected.

Referring more especially to the drawings, 1 designates one of the driving wheels of an automobile 2, and 3 denotes the windlass draft drum which consists of a cylindrical hollow member designed to fit over the hub of the driving wheel 1 and is provided with end flanges 4 and 5. The flange 5 acts to prevent the draft windlass cable 6 from displacement when being wound upon the drum. The flange 4 is provided with a plurality of apertures 7 arranged in pairs, each pair being coincident to a spoke in the driving wheel, so as to receive a staple 8 which arches the spoke, whereby the arms or shanks thereof may pass through the aperture 7 and receive nuts 9, thereby holding the windlass drum to the driving wheel. The drum 3 has an eye 10, to which the draft cable 6 is attached, the other end of which is, in turn, adapted to be connected to a suitable stake, stump, tree or the like 11, so that when the driving wheel 1 starts rotating, the cable will wind upon the drum and extricate the automobile from the mire or mud or the like. In Figs. 4, 5, 6 and 7, the apertures 7 are dispensed with, and T-shaped slots are substituted. The portions 12 of the T-shaped slots 13 extend outwardly toward the edge of the flange 4 of the drum, while the portions 14 of said slots are disposed concentric with the center of the drum. However, the slots 13 are arranged in pairs, each coincident to a spoke of the driving wheel. It is to be noted that in Figs. 4, 5, 6 and 7, the arms 15 of the staples have laterally extending portions 16, so that the staples may arch over the spokes without removal of the nuts 17, which are threaded upon the parts 18 of the arms of the staples. The parts 18 extend from the laterally extending portion 16. It is to be noted that each staple may arch its respective spoke beyond the flange 4 of the drum, then the staple may be moved toward the flange, so that portions 18 of the arm will enter the parts 12 of the T-shaped slots, the nuts 17 being upon the exterior face of the flange 4. Each staple is moved until the parts or portions 18 are adjacent the portions 14 of the T-shaped slots, after which a partial turn is imparted to the drum, whereby one or another of the portions 18 will enter one end or the other of the portions 14 of the T-shaped slots, thereby locking the drum to the spokes of the wheel, without tightening up the nuts 17. Before imparting the partial turn to the drum to lock the same, it should be determined as to which direction the cable is to wind upon the drum, so that the portions 18 of the arms will enter those ends of the portions 14 of the slots opposite the winding action of the draft cable, so as to insure preventing displacement of the drum.

The invention having been set forth, what is claimed as new and useful is:—

1. An emergency draft windlass for the purpose set forth provided with a flexible draft member, comprising a hollow drum fitted telescopically over the hub of an automobile wheel, and having end flanges, one of said flanges having a plurality of T-shaped slots arranged in pairs, each coincident to a spoke of the driving wheel, the portion of each slot forming the top of the T being concentric with the center of the drum, the other portion of the T-shaped slot extending toward the edge of the flange of the drum, and staples arching the spokes, the arms of each entering the T-shaped slots adjacent the T-portions thereof, whereby upon imparting a partial movement to the drum the arms of the staples will enter the ends of the T-portions of the slots, thereby detachably clamping the drum to the wheel.

2. An emergency draft windlass for the purpose set forth provided with a flexible draft member, comprising a hollow drum fitted telescopically over the hub of an automobile wheel, and having end flanges, one of said flanges having a plurality of T-shaped slots arranged in pairs, each coincident to a spoke of the driving wheel, the portion of each slot forming the top of the T being concentric with the center of the drum, the other portion of the T-shaped slot extending toward the edge of the flange of the drum, and staples arching the spokes, the arms of each entering the T-shaped slots adjacent the T-portions thereof, whereby upon imparting a partial movement to the drum the arms of the staples will enter the ends of the T-portions of the slots, thereby detachably clamping the drum to the wheel, means upon the arms of the staples to tighten the drum in position, the arms of the staples having means whereby the staples may arch the spokes of the wheel without removal of the tightening means.

In testimony whereof I have signed my name to this specification in the presence of two subscribing witnesses.

LAWRENCE FERNHOLZ.

Witnesses:
J. J. FERNHOLZ,
F. B. McWERNY.